(12) United States Patent
Gupta et al.

(10) Patent No.: US 10,102,029 B2
(45) Date of Patent: Oct. 16, 2018

(54) EXTENDING A MAP-REDUCE FRAMEWORK TO IMPROVE EFFICIENCY OF MULTI-CYCLE MAP-REDUCE JOBS

(71) Applicant: International Business Machines Corporation, Armonk, NY (US)

(72) Inventors: Himanshu Gupta, New Delhi (IN); Sriram Lakshminarasimhan, Chennai (IN); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 14/788,268

(22) Filed: Jun. 30, 2015

(65) Prior Publication Data
US 2017/0004163 A1 Jan. 5, 2017

(51) Int. Cl.
G06F 17/30 (2006.01)
G06F 7/00 (2006.01)
G06F 9/46 (2006.01)

(52) U.S. Cl.
CPC .......... *G06F 9/46* (2013.01); *G06F 17/30483* (2013.01)

(58) Field of Classification Search
CPC .............................. G06F 9/46; G06F 17/30483
USPC .......................................................... 707/738
See application file for complete search history.

(56) References Cited

U.S. PATENT DOCUMENTS

| 8,126,909 | B2 | 2/2012 | Pike et al. | |
| 8,190,610 | B2* | 5/2012 | Dasdan | G06F 17/30584 707/737 |
| 8,819,335 | B1* | 8/2014 | Salessi | G06F 12/0246 711/103 |
| 8,959,138 | B2* | 2/2015 | Narang | G06F 9/5066 345/505 |
| 9,002,871 | B2* | 4/2015 | Bulkowski | G06F 17/30545 707/711 |
| 9,311,380 | B2* | 4/2016 | Chawda | G06F 17/30545 |
| 9,646,024 | B2* | 5/2017 | Srivas | G06F 17/30215 |

(Continued)

FOREIGN PATENT DOCUMENTS

WO WO2013153027 A1 10/2013

OTHER PUBLICATIONS

Lei, Chuan, et al., "Redoop Infrastructure for Recurring Big Data Queries", 40th International Conference on Very Large Data Bases (VLDB '14), Hangzhou, China, Sep. 1-5, 2014, 4 pages, ACM Digital Library.

(Continued)

*Primary Examiner* — Pavan Mamillapalli
(74) *Attorney, Agent, or Firm* — Ference & Associates LLC

(57) ABSTRACT

Methods and arrangements for managing map-reduce jobs. There are identified intermediate data produced, in a current map-reduce cycle, by a plurality of nodes in the distributed network, the nodes being selected from the group consisting of: a plurality of map nodes, and a plurality of reducer nodes. There are identified a plurality of classes of data, for classifying the intermediate data. Discrete portions of the intermediate data are classified into respective ones of the classes of data, wherein at least one of the classes of data comprises intermediate data which are processed in a map-reduce cycle subsequent to the current map-reduce cycle. Other variants and embodiments are broadly contemplated herein.

20 Claims, 4 Drawing Sheets

(56) References Cited

U.S. PATENT DOCUMENTS

| | | | |
|---|---|---|---|
| 9,740,706 B2* | 8/2017 | Cramer | G06F 17/30203 |
| 9,832,137 B1* | 11/2017 | Tan | H04L 47/78 |
| 9,910,888 B2* | 3/2018 | Appleton | G06F 17/30424 |
| 2008/0120314 A1* | 5/2008 | Yang | G06F 17/30498 |
| 2011/0047172 A1* | 2/2011 | Chen | G06F 17/30445 |
| | | | 707/764 |
| 2011/0154341 A1* | 6/2011 | Pueyo | G06F 9/5066 |
| | | | 718/101 |
| 2012/0254193 A1* | 10/2012 | Chattopadhyay | G06F 17/30979 |
| | | | 707/747 |
| 2012/0311589 A1* | 12/2012 | Agarwal | G06F 9/5066 |
| | | | 718/102 |
| 2013/0024412 A1* | 1/2013 | Gong | G06N 5/00 |
| | | | 706/46 |
| 2013/0086356 A1* | 4/2013 | Narang | G06F 15/17318 |
| | | | 712/30 |
| 2013/0297624 A1* | 11/2013 | Raghunathan | G06F 17/30675 |
| | | | 707/752 |
| 2014/0006383 A1 | 1/2014 | Hacigumus et al. | |
| 2014/0019979 A1* | 1/2014 | Amershi | G06F 11/34 |
| | | | 718/101 |
| 2014/0059552 A1* | 2/2014 | Cunningham | G09G 5/00 |
| | | | 718/102 |
| 2014/0101092 A1* | 4/2014 | Simitsis | G06F 17/30398 |
| | | | 707/602 |
| 2014/0156849 A1* | 6/2014 | Kim | G06F 9/5066 |
| | | | 709/226 |
| 2015/0242483 A1* | 8/2015 | Zhou | G06F 9/5066 |
| | | | 707/736 |

OTHER PUBLICATIONS

Trieu, Thi-Thu-Lan, "Immediate data management for map/reduce applications", Distributed, Parallel, and Cluster Computing, 2010, 38 pages, available at: http://dumas.ccsd.cnrs.fr/dumas-00530784.

Bu, Yingyi, et al., "HaLoop: Efficient Iterative Data Processing on Large Clusters", 36th International Conference on Very Large Data Bases, Proceedings of the VLDB Endowment, Singapore, Sep. 13-17, 2010, 12 pages, vol. 3, No. 1, VLDB Endowment.

Elghandour, Iman, et al., "ReStore: Reusing Results of MapReduce Jobs", 38th International Conference on Very Large Data Bases, Proceedings of the VLDB Endowment, Istanbul, Turkey, Aug. 27-31, 2012, 12 pages, vol. 5, No. 6, VLDB Endowment.

* cited by examiner

EXTENDING A MAP-REDUCE FRAMEWORK TO IMPROVE EFFICIENCY OF MULTI-CYCLE MAP-REDUCE JOBS

BACKGROUND

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Generally, MapReduce has emerged as a dominant paradigm for processing large datasets in parallel on computing clusters. As an open source implementation, Hadoop has become popular in a short time for its success in a variety of applications, such as social network mining, log processing, video and image analysis, search indexing, recommendation systems, etc. In many scenarios, long batch jobs and short interactive queries are submitted to the same MapReduce cluster, sharing limited common computing resources with different performance goals. These conditions, among others, present challenges that have been elusive to resolve conventionally.

BRIEF SUMMARY

In summary, one aspect of the invention provides a method of managing map-reduce jobs in a distributed network, said method comprising: utilizing at least one processor to execute computer code that performs the steps of: identifying intermediate data produced, in a current map-reduce cycle, by a plurality of nodes in the distributed network, the nodes being selected from the group consisting of: a plurality of map nodes, and a plurality of reducer nodes; identifying a plurality of classes of data, for classifying the intermediate data; and classifying discrete portions of the intermediate data into respective ones of the classes of data; wherein at least one of the classes of data comprises intermediate data which are processed in a map-reduce cycle subsequent to the current map-reduce cycle.

Another aspect of the invention provides an apparatus for managing map-reduce jobs in a distributed network, said apparatus comprising: at least one processor; and a computer readable storage medium having computer readable program code embodied therewith and executable by the at least one processor, the computer readable program code comprising: computer readable program code configured to identify intermediate data produced, in a current map-reduce cycle, by a plurality of nodes in the distributed network, the nodes being selected from the group consisting of: a plurality of map nodes, and a plurality of reducer nodes; computer readable program code configured to identify a plurality of classes of data, for classifying the intermediate data; and computer readable program code configured to classify discrete portions of the intermediate data into respective ones of the classes of data; wherein at least one of the classes of data comprises intermediate data which are processed in a map-reduce cycle subsequent to the current map-reduce cycle.

An additional aspect of the invention provides a computer program product for managing map-reduce jobs, said computer program product comprising: a computer readable storage medium having computer readable program code embodied therewith, the computer readable program code comprising: computer readable program code configured to identify intermediate data produced, in a current map-reduce cycle, by a plurality of nodes in the distributed network, the nodes being selected from the group consisting of: a plurality of map nodes, and a plurality of reducer nodes; computer readable program code configured to identify a plurality of classes of data, for classifying the intermediate data; and computer readable program code configured to classify discrete portions of the intermediate data into respective ones of the classes of data; wherein at least one of the classes of data comprises intermediate data which are processed in a map-reduce cycle subsequent to the current map-reduce cycle.

A further aspect of the invention provides a method comprising: identifying intermediate data comprising: intermediate data produced by a plurality of map nodes in a distributed network, in a current map-reduce cycle; and intermediate data produced by a plurality of reducer nodes in the distributed network, in the current map-reduce cycle; identifying a plurality of classes of data, for classifying the identified intermediate data; and classifying discrete portions of the identified intermediate data into respective ones of the classes of data; the plurality of classes comprising: at least two classes of the intermediate data produced by the map nodes in the current map-reduce cycle; and at least two classes of the intermediate data produced by the reducer nodes in the current map-reduce cycle; the at least two classes of the intermediate data produced by the map nodes in the current map-reduce cycle including: a first class of data, which are communicated to one or more of the reducer nodes within the current map-reduce cycle; and a second class of data, which are processed by one or more map tasks in the map-reduce cycle subsequent to the current map-reduce cycle; wherein the first and second classes of data are non-overlapping with respect to one another; and the at least two classes of the intermediate data produced by the reducer nodes in the current map-reduce cycle including: a third class of data, which are communicated to one or more of the reducer nodes in a map-reduce cycle subsequent to the current map-reduce cycle; and a fourth class of data, which are processed by one or more reduce tasks to run in a map-reduce cycle subsequent to the current map-reduce cycle, at the same reducer node utilized in the current map-reduce cycle; wherein the third and fourth classes of data are non-overlapping with respect to one another.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
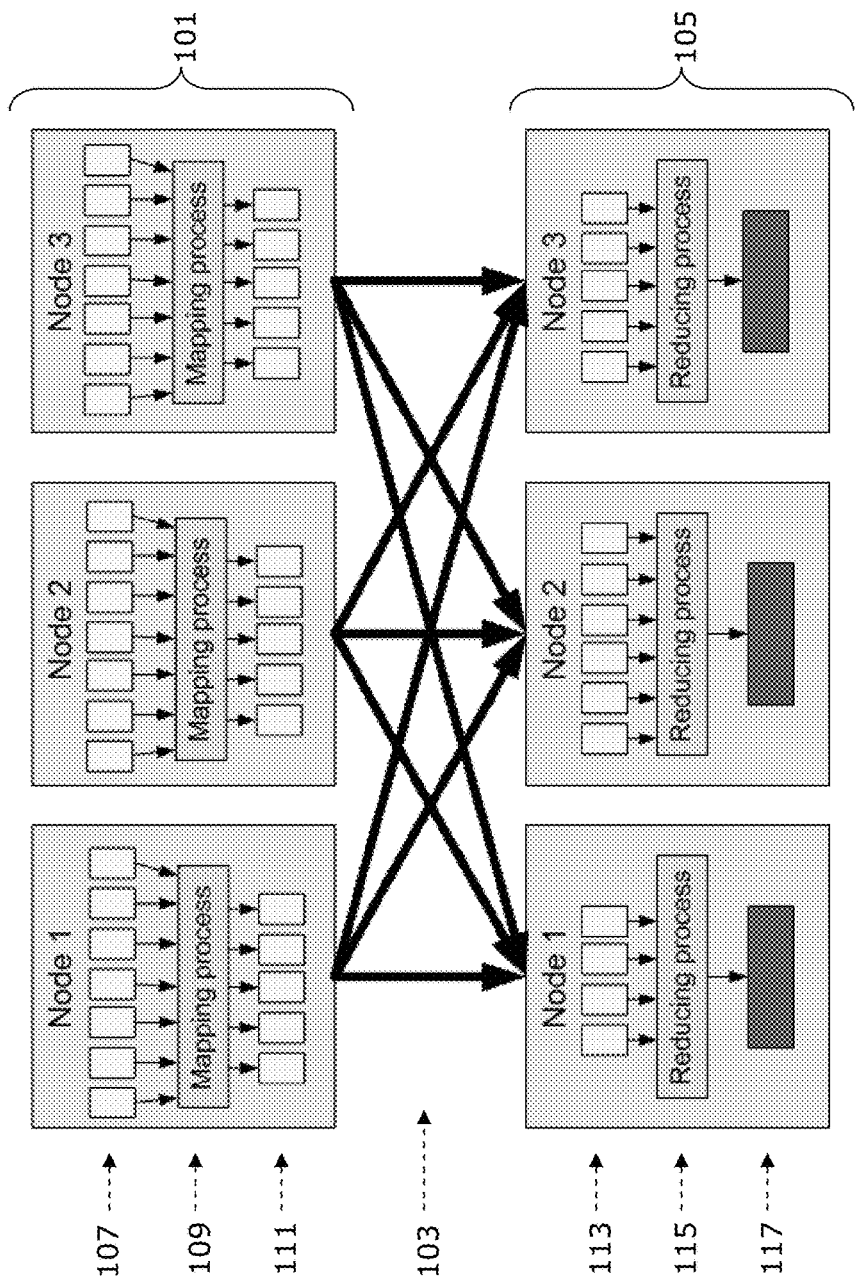
FIG. 1 schematically illustrates a conventional MapReduce framework.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements for improving the performance of multi-cycle map-reduce jobs. This can involve a system and a method for generating multiple classes of data by both map and reduce tasks, particularly, where intermediate data by map tasks include two classes, one for communication to the reducers within the same map-reduce cycle and one to be processed by map tasks in a successive map-reduce cycle. Further, reduce output can include three classes, one for communication to all reducers in the successive map-reduce cycle, one to be processed by the reduce process to run locally in the successive map-reduce cycle and third, a part of the final output. Additionally, there may be provided a system and a method for communicating intermediate data, including a method for communication from reduce tasks to reduce tasks across consecutive map-reduce cycles, and a method for selective communication of data from map tasks to reduce tasks within a map-reduce cycle. Further, there is broadly contemplated herein a system and a method for scheduling and executing map and reduce tasks exploiting the properties of different classes of intermediate data.

The features discussed above, and others, relating to at least one embodiment of the invention, will be better appreciated from the discussion which follows.

Figure 2:
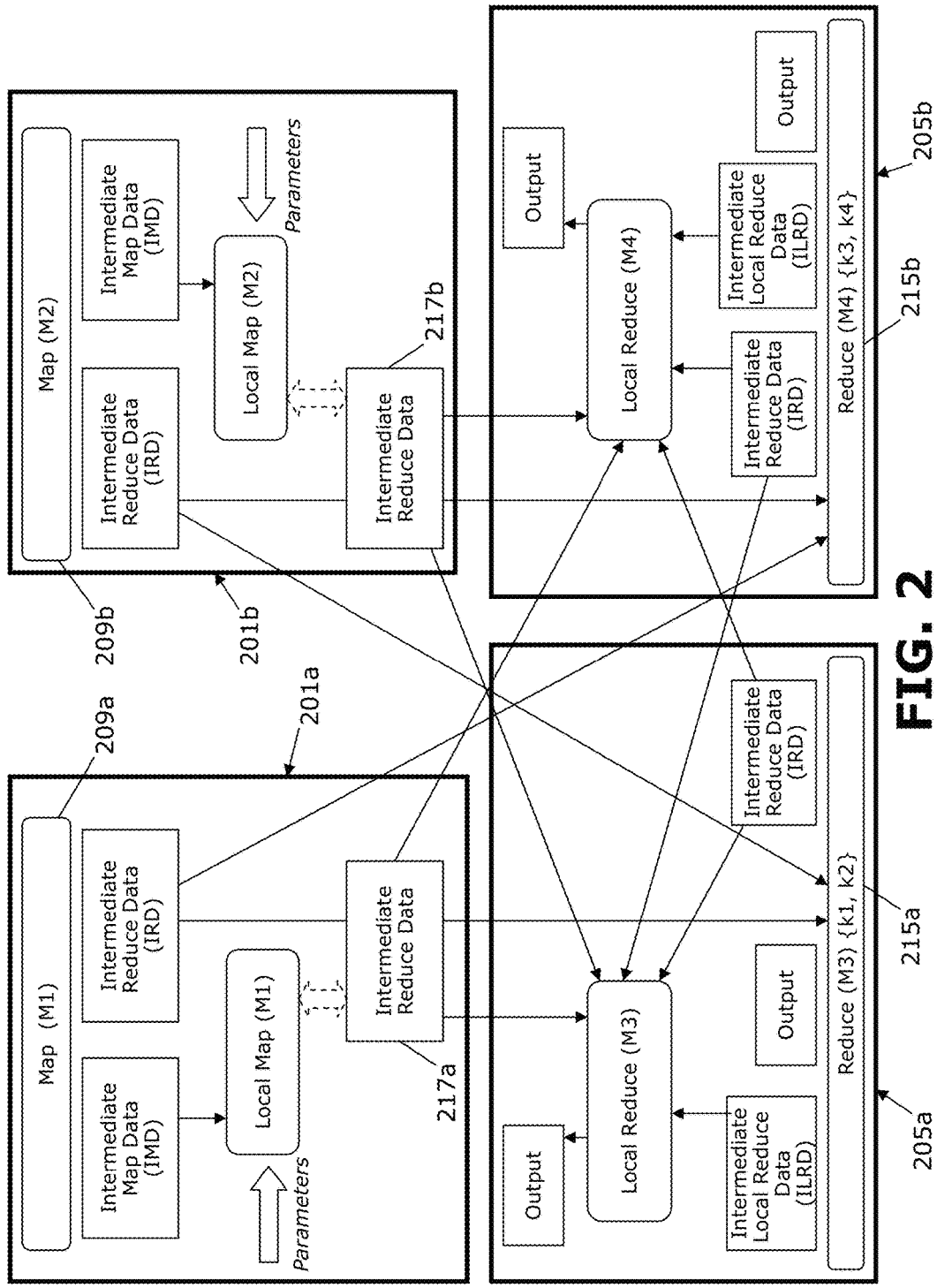
FIG. 2 schematically illustrates a general system architecture.

In accordance with a general background relative to at least one embodiment of the invention, FIG. 1 schematically illustrates a conventional MapReduce framework. Shown are three mapping nodes (101) and three reducer nodes (105), along with an intermediate shuffling process (103). Each mapper node (105) accepts pre-loaded local input data 107 into a mapping process (or map task) 109, which then produces intermediate data 111 as output. Subsequent to values being exchanged by the shuffling process (103), the reducer nodes (105) accept input data 113 from the shuffling, and a reducing process (or reduce task) 115 in each reducer node then generates outputs 117 that are stored locally. Generally, conventional MapReduce frameworks do not include any in-built support for executing multi-cycle MapReduce jobs.

Broadly contemplated herein, in accordance with at least one embodiment of the invention, are methods and arrangements for specifying and executing multi-cycle map-reduce jobs. In this manner, a capability is provided of storing intermediate data at different stages of a map-reduce pipeline. Also by way of advantages contemplated herein, communication overhead is reduced vis-à-vis conventional map-reduce frameworks. Additionally, the number of map-reduce cycles involved in computation may also decrease, along with general programming effort.

Typically, in accordance with a general background relative to at least one embodiment of the invention, communication of data from map tasks to reduce tasks involves reading data from a HDFS (Hadoop Distributed File System), processing the data, and writing the output to local disk. Map output is in the form of a key-value pair $\{k, v\}$. The HDFS is a distributed file system used for storing large amount of data. On the other hand, reduce tasks read the map output which is stored on local disks, processes it, generate the output and write the output to the HDFS. Here, all the pairs for key k are processed by one reducer. To this end, the MapReduce framework collects the pairs with key=k from all map tasks, groups it and converts it to key-value pair $\{k, [v]\}$ where [v] is the set of values in the map output pairs with key=k. The pair $\{k,[v]\}$ is forwarded to one reduce task.

Generally, if a job requires multiple map-reduce cycles (also referred to hereinafter as "MR cycles"), map tasks in a second cycle again read the data from the HDFS which possibly also include the output of the first cycle, process the data, and write the output to local disk. Next, reduce tasks in the second cycle read the output of the map tasks in the second cycle, process the data, generate the output data and write the same to the HDFS. This process repeats as many times as the number of map-reduce cycles required by the job.

Generally, in accordance with at least one embodiment of the invention, it is recognized that there is significant room for streamlining or optimization in multi-cycle MapReduce Jobs. For instance, it is often the case that some identical data are read and communicated to reduce tasks by map tasks in multiple map-reduce cycles. Thus, one measure may involve permitting the user to locally store the communicated data at a reducer and hence remove the need of reading and communicating the same data in each MR cycle. Such a measure removes the processing of such data by map tasks and then shuffling these data to the reduce tasks.

Generally, in accordance with at least one embodiment of the invention, it is recognized that reduce tasks in a MR cycle often generate some output data which need to be communicated to various reducers in the second MR cycle. In a conventional framework, such data are written to HDFS, read in the second MR cycle and then communicated to the reducers. Accordingly, another measure as broadly contemplated herein may involve allowing the reducers in the second MR cycle to directly read these data from the disk without the need to execute any map tasks. This eliminates additional overhead otherwise associated with reading the data by map-tasks and writing the map-output to a local disk.

In accordance with at least one embodiment of the invention, it is recognized that different parts of the same data-set may be required to be processed by map tasks in different cycles. In many cases, these different cycles will process the data in different ways. In a conventional framework, the complete data-set will be read by map tasks in different cycles. The map tasks in different cycles will identify the relevant part of the data and process these. Often, it will be the case that the sizes of these relevant parts will be much smaller vis-à-vis the complete data-set; but still the whole data-set will be read and parsed in each cycle leading to redundant processing. Accordingly, another measure (as broadly contemplated herein) involves that a map task may generate two classes of intermediate data. Data belonging to the first class is communicated to the reducers in the same cycle. The data in the second class will be processed by map tasks in the successive cycles and will not be communicated to the reducers. This avoids reading in, and processing, a large data-set in multiple cycles for the purposes of identifying and processing different parts of that data-set.

In accordance with at least one embodiment of the invention, it is recognized that, in many cases, only part of the data communicated from a Map phase is used at the Reduce phase, while the remaining data are redundantly communicated to the reducers. Accordingly, another measure involves allowing selective communication of data from the map phase to the reduce phase. The reduce tasks can set up some parameters which the map tasks in the next cycle can utilize to decide which data to selectively process and communicate. The ensuing discussion will provide more clarity to these and other concepts.

In accordance with at least one embodiment of the invention, there are broadly contemplated herein methods and arrangements for extending the MapReduce framework such that map tasks generate two different classes of intermediate data, and reduce tasks generate three different classes of data. FIG. 2 schematically illustrates a system architecture incorporating such an arrangement; further details thereof will be appreciated from the ensuing discussion. It should be noted, in this connection that FIG. 2 essentially represents, illustratively and non-restrictively, a working example of a job that includes two map-reduce cycles. In the event of more than two map-reduce cycles, and in a manner that will be better appreciated from the ensuing discussion, the "local map" and "local reduce" stages (as discussed below) will repeat.

In accordance with at least one embodiment of the invention, for the purposes of illustration, consider two map nodes 201*a/b* (which include map tasks 209*a/b*, respectively) and two reducer nodes 205*a/b* (which include reduce tasks 215*a/b*, respectively). The two map (data) classes include: Intermediate Reduce Data (IRD), which are communicated to the reducers; and Intermediate Map Data (IMD), which are not communicated to the reducers and instead are read by a local map task in the second cycle. (Some IRD shown in the drawing, indicated at 217*a/b*, are associated with local map tasks [as shown via dotted block arrows], and the function of these data will be better understood from the ensuing discussion.) The three classes of reduce output include: partial output, which forms a part of the final output and is written to HDFS; Intermediate Reduce Data (IRD), which are communicated to the reducers; and Intermediate Local Reduce Data (ILRD), which are read by the local reduce tasks in the second cycle. Different classes of data come to be stored separately. Further, reducers act to generate parameters which are used by the map tasks in the second cycle. Additionally, all the reduce tasks in different cycles which process the key k are executed on the same machine. All of this stands in stark contrast to conventional MapReduce frameworks, where map tasks generate only one class of data that are communicated to the reducers, and reduce tasks also generate only one class of data which is written on HDFS and possibly read by map tasks in the second MR cycle.

By way of elaboration, in accordance with at least one embodiment of the invention, for map output, IRD format remains the same, i.e., a key-value pair $\{k, v\}$, and the MR framework collects all the pairs in IRD with same key k, converts them to the pair $\{k, [v]\}$ and sends it to one reducer. On the other hand, IMD are not sent to reducers, and are processed by a map task in the second cycle.

In accordance with at least one embodiment of the invention, for Reduce output, "partial output" constitutes a portion of the final output, and is written on the HDFS without being modified further. Here, the IRD format remains the same (i.e., a key-value pair $\{k, v\}$) and is stored locally; also, the MR framework collects all the pairs in IRD with identical key k, converts them to the pair $\{k, [v]\}$ and sends it to the reducer processing key k in the following MR cycle. The ILRD format is again the same (i.e., a key-value pair $\{k, v\}$) and is stored locally; further, it is not sent to all reducers and is processed by a local reduce task in the second cycle. Thus, all ILRD come to be processed by only one reduce task in the next cycle.

In accordance with at least one embodiment of the invention, the map task in cycle 1 reads data from the HDFS, while the map task in other cycles reads the Intermediate Map Data (IMD) of the map tasks from the previous MR cycle as well as possibly some new data from HDFS. A reduce task in cycle 1 reads the Intermediate Reduce Data (IRD) of the map tasks in cycle 1, while a reduce task in any subsequent cycle i reads: the Intermediate Reduce Data (IRD) of the map tasks in cycle i; Intermediate Reduce Data (IRD) of the reduce tasks in cycle i−1; and Intermediate Local Reduce Data (ILRD) of the reduce task in cycle i−1. All the pairs with key=k in IRD data of map tasks in cycle i, in IRD data of reduce tasks in cycle i−1 and ILRD data of reduce task in cycle i−1 are processed by the same reduce task in cycle i. Further, a reduce task in cycle i sets some parameters which are used by the map tasks in cycle i+1.

The reduce tasks processing the data for key=k in different cycle are executed on the same machine. This ensures that ILRD data in cycle i are processed by only local reducers in cycle i+1.

As discussed and alluded to heretofore, in accordance with at least one embodiment of the invention, several potential measures can be adopted in order to promote greater efficiency in a MR framework. Thus, since some identical data are often read in multiple cycles, such data can be stored in ILRD cache. Since reduce tasks processing key=k in different cycles run on the same machine, the reduce task in cycle i processing key=k can read these data locally from ILRD. Accordingly, such data will only need to be communicated to the reducers once, i.e., in the first cycle; for the remaining cycles, these data will be locally available in ILRD cache. This forestalls the communication of such data in each cycle, thereby reducing communication overhead.

To elaborate, in accordance with at least one embodiment of the invention, it is recognized that a reducer often operates on key-value pair {k, [v]} and transforms it to {k, [v']}. The pair {k [v']} is operated on by a reduce task in the second MR cycle. Thus, ILRD can hold the reducer output, with the ILRD output of a reduce task in cycle i then processed by a reduce task in cycle i+1. Such pairs {k, [v']} are held in ILRD cache and thus can be accessed locally. Thus, these pairs need not be written to HDFS, read by the map tasks in the next cycle and then communicated to the reduce tasks, thereby reducing communication overhead.

In yet another measure, in accordance with at least one embodiment of the invention, it is recognized that reduce tasks in the first MR cycle often generate some output data which need to be communicated to various reducers in the second MR cycle. Such data thus can be stored in the cache IRD. A reducer processing key k can generate output key-value pairs with any key (the output key can be anything other than k). IRD data in cycle i is processed by reduce tasks in cycle i+1. A reduce task processing key k in cycle i+1 checks the IRD cache of all reducers in cycle i, checks if there are any pairs with key=k and fetches these pairs. The presence of IRD cache ensures that there is no need for map tasks to process such data, write the map output locally and then communicate it to various reducers. The IRD cache hence avoids such additional overhead while reducing the additional map cycle.

In an additional measure, in accordance with at least one embodiment of the invention, it is recognized that multiple cycles often process different small parts of the same large dataset. In such cases, map tasks in one cycle can also prepare these different parts of the dataset which will be processed in different cycles. These parts can be stored as part of IMD cache. The map tasks in the successive cycles can hence process the small volume data from IMD cache rather than the large sized data from HDFS. This hence avoids additional overheads of reading and parsing a large dataset multiple times.

In an additional measure, in accordance with at least one embodiment of the invention, it is recognized that often only part of the data communicated from the map phase is used at the reduce phase. Thus, reduce tasks in cycle i can set some parameters which are used by map tasks in cycle i+1. Map tasks in cycle i+1 use these parameters to specify which data to selectively communicate to the reducers. This then reduces communication overhead and improves overall efficiency.

Generally, it should be understood that "classes" as discussed herein can be predefined in accordance with pre-established (or predetermined) criteria, or can be defined ad-hoc in response to an assessment of intermediate data that are produced. Also, in accordance with at least one preferred embodiment, all "classes" of data as discussed herein may be considered to be non-overlapping with respect to one another, at least in the context of a single map node or a single reducer node. To this end, discrete (e.g., delineated) portions of intermediate data can be classified into different classes.

It can be appreciated from the foregoing that, in accordance with at least one embodiment of invention, a technical improvement is represented at least via methods and arrangements for improving the performance of multi-cycle map-reduce jobs, which can involve a system and a method for generating multiple classes of intermediate data by both map and reduce tasks, particularly, where intermediate data by map tasks include two classes, one for communication to the reducers within the same map-reduce cycle and one to be processed by map tasks in a successive map-reduce cycle.

In accordance with at least one embodiment of the invention, very generally, quantitative values as determined herein, or other data or information as used or created herein, can be stored in memory or displayed to a user on a screen, as might fit the needs of one or more users.

Figure 3:
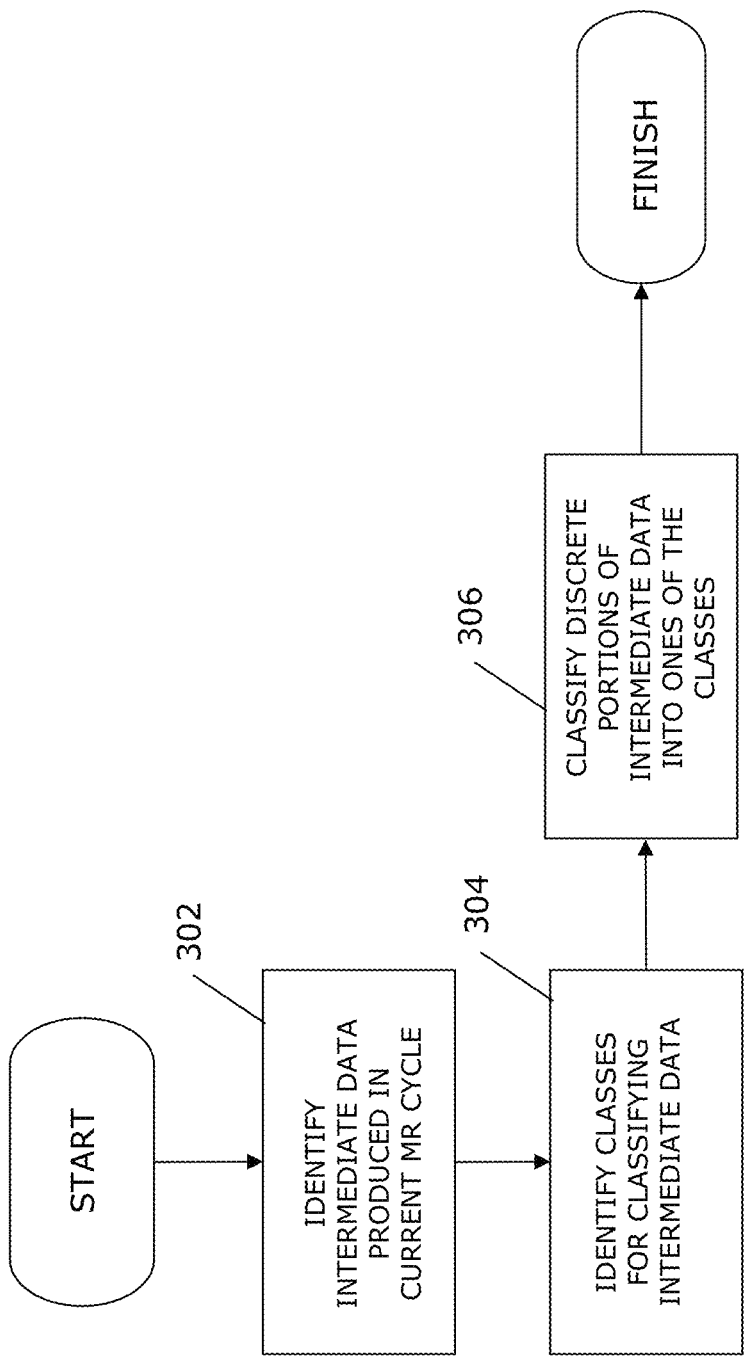
FIG. 3 sets forth a process more generally for managing map-reduce jobs in a distributed network.

FIG. 3 sets forth a process more generally for managing map-reduce jobs in a distributed network, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, there are identified intermediate data produced, in a current map-reduce cycle, by a plurality of nodes in the distributed network, the nodes being selected from the group consisting of: a plurality of map nodes, and a plurality of reducer nodes (302). There are identified a plurality of classes of data, for classifying the intermediate data (304). Discrete portions of the intermediate data are classified into respective ones of the classes of data, wherein at least one of the classes of data comprises intermediate data which are processed in a map-reduce cycle subsequent to the current map-reduce cycle (306).

Figure 4:
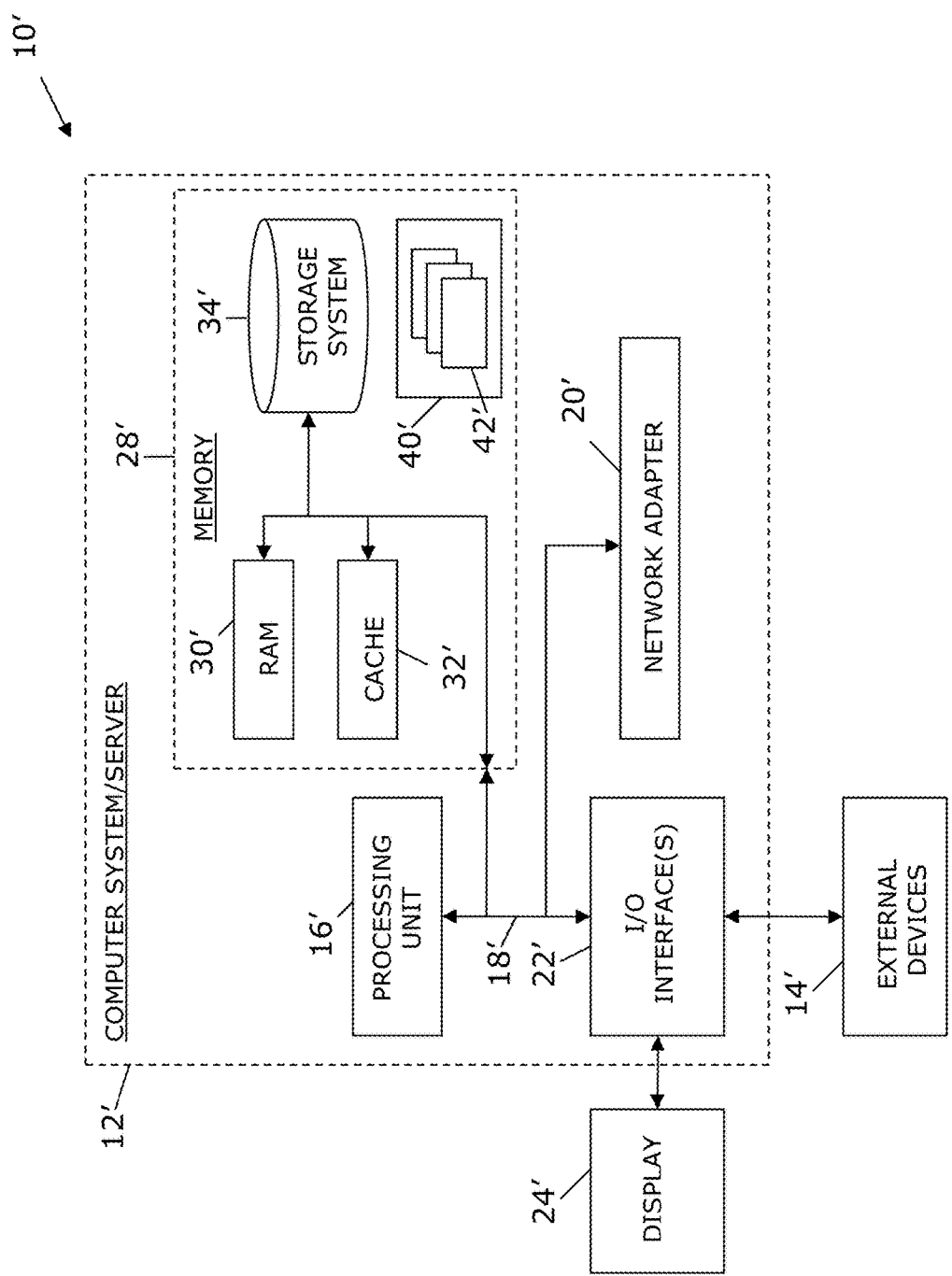
FIG. 4 illustrates a computer system.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing map-reduce jobs in a distributed network, said method comprising:
   utilizing at least one processor to execute computer code that performs the steps of:
   identifying intermediate data produced, in a current map-reduce cycle, by a plurality of nodes in the distributed network, the nodes being selected from the group consisting of: a plurality of map nodes, and a plurality of reducer nodes;
   identifying a plurality of classes of data, for classifying the intermediate data, wherein the plurality of classes identify a task within a cycle to process the intermediate data and wherein the plurality of classes comprise: a map node intermediate reduce data class, a map node intermediate map data class, reducer node intermediate reduce data class, reducer node intermediate local reduce data class, and partial output class; and
   classifying discrete portions of the intermediate data into respective ones of the classes of data, wherein the classifying comprises classifying intermediate data requiring processing by a reduce task within the same cycle with respect to a map node into the map node intermediate reduce data class, classifying intermediate data requiring processing by a map task within a successive cycle with respect to a map node into the map node intermediate map data class, classifying intermediate data requiring processing by all reducers within a successive cycle with respect to a reducer node into the reducer node intermediate reduce data class, classifying intermediate data requiring processing by a local reducer within a successive cycle with respect to a reducer node into the reducer node intermediate local reduce data class, and classifying intermediate data identified as forming part of a final output with respect to a reducer node into the partial output class;

wherein at least one of the classes of data comprises intermediate data which are processed in a map-reduce cycle subsequent to the current map-reduce cycle and wherein each portion of intermediate data is classified into a single one of the plurality of classes and wherein the intermediate data is read directly by a subsequent task from a preceding task selected from: one of the plurality of map nodes or one of the plurality of reducer nodes.

2. The method according to claim 1, wherein:
the intermediate data comprise intermediate data produced by the map nodes in the current map-reduce cycle; and
the plurality of classes comprise at least two classes of the intermediate data produced by the map nodes in the current map-reduce cycle.

3. The method according to claim 2, wherein the at least two classes include:
a first class of data, which are communicated to one or more of the reducer nodes within the current map-reduce cycle; and
a second class of data, which are processed by one or more map tasks in the map-reduce cycle subsequent to the current map-reduce cycle;
wherein the first and second classes of data are non-overlapping with respect to one another.

4. The method according to claim 3, wherein data in the first class of data are communicated to one reducer node within the current map-reduce cycle.

5. The method according to claim 3, wherein the data in the second class of data are processed by a map task in a map-reduce cycle that is carried out immediately subsequent to the current map-reduce cycle.

6. The method according to claim 1, wherein:
the intermediate data comprise intermediate data produced by the reducer nodes in the current map-reduce cycle; and
the plurality of classes comprise at least two classes of the intermediate data produced by the reducer nodes in the current map-reduce cycle.

7. The method according to claim 6, wherein the at least two classes include:
a first class of reduce output data, which are communicated to one or more of the reducer nodes in a map-reduce cycle subsequent to the current map-reduce cycle; and
a second class of reduce output data, which are processed by one or more reduce tasks to run in a map-reduce cycle subsequent to the current map-reduce cycle, at the same reducer node utilized in the current map-reduce cycle;
wherein the first and second classes of reduce output data are non-overlapping with respect to one another.

8. The method according to claim 7, wherein the data in the first class of reduce output data are sent to one reducer node in a map-reduce cycle immediately subsequent to the current map-reduce cycle.

9. The method according to claim 7, wherein the data in the second class of reduce output data are processed by one local reduce task, in a map-reduce cycle immediately subsequent to the current map-reduce cycle, at the same reducer node utilized in the current map-reduce cycle.

10. The method according to claim 7, wherein:
the reducer nodes collectively generate final output; and
the at least two classes of the intermediate data produced by the reducer nodes in the current map-reduce cycle include a third class of reduce output data, comprising a portion of the final output.

11. The method according to claim 10, wherein the data in the third class of reduce output data are produced as a portion of the final output without further modification.

12. The method according to claim 1, wherein:
the reducer nodes collectively generate final output; and
each of the reducer nodes, in each of a plurality of cycles, generates a portion of the final output.

13. The method according to claim 1, wherein said identifying of a plurality of classes comprises identifying classes which are predefined in accordance with predetermined criteria.

14. The method according to claim 1, wherein said identifying of a plurality of classes comprises defining the classes ad-hoc, in response to said identifying of intermediate data.

15. An apparatus for managing map-reduce jobs in a distributed network, said apparatus comprising:
at least one processor; and
a computer readable storage medium having computer readable program code embodied therewith and executable by the at least one processor, the computer readable program code comprising:
computer readable program code configured to identify intermediate data produced, in a current map-reduce cycle, by a plurality of nodes in the distributed network, the nodes being selected from the group consisting of: a plurality of map nodes, and a plurality of reducer nodes;
computer readable program code configured to identify a plurality of classes of data, for classifying the intermediate data, wherein the plurality of classes identify a task within a cycle to process the intermediate data and wherein the plurality of classes comprise: a map node intermediate reduce data class, a map node intermediate map data class, reducer node intermediate reduce data class, reducer node intermediate local reduce data class, and partial output class; and
computer readable program code configured to classify discrete portions of the intermediate data into respective ones of the classes of data, wherein the classifying comprises classifying intermediate data requiring processing by a reduce task within the same cycle with respect to a map node into the map node intermediate reduce data class, classifying intermediate data requiring processing by a map task within a successive cycle with respect to a map node into the map node intermediate map data class, classifying intermediate data requiring processing by all reducers within a successive cycle with respect to a reducer node into the reducer node intermediate reduce data class, classifying intermediate data requiring processing by a local reducer within a successive cycle with respect to a reducer node into the reducer node intermediate local reduce data class, and classifying intermediate data identified as forming part of a final output with respect to a reducer node into the partial output class;

wherein at least one of the classes of data comprises intermediate data which are processed in a map-reduce cycle subsequent to the current map-reduce cycle and wherein each portion of intermediate data is classified into a single one of the plurality of classes and wherein the intermediate data is read directly by a subsequent task from a preceding task selected from: one of the plurality of map nodes or one of the plurality of reducer nodes.

16. A computer program product for managing map-reduce jobs, said computer program product comprising:
a computer readable storage medium having computer readable program code embodied therewith, the computer readable program code comprising:
computer readable program code configured to identify intermediate data produced, in a current map-reduce cycle, by a plurality of nodes in the distributed network, the nodes being selected from the group consisting of: a plurality of map nodes, and a plurality of reducer nodes;
computer readable program code configured to identify a plurality of classes of data, for classifying the intermediate data, wherein the plurality of classes identify a task within a cycle to process the intermediate data and wherein the plurality of classes comprise: a map node intermediate reduce data class, a map node intermediate map data class, reducer node intermediate reduce data class, reducer node intermediate local reduce data class, and partial output class; and
computer readable program code configured to classify discrete portions of the intermediate data into respective ones of the classes of data, wherein the classifying comprises classifying intermediate data requiring processing by a reduce task within the same cycle with respect to a map node into the map node intermediate reduce data class, classifying intermediate data requiring processing by a map task within a successive cycle with respect to a map node into the map node intermediate map data class, classifying intermediate data requiring processing by all reducers within a successive cycle with respect to a reducer node into the reducer node intermediate reduce data class, classifying intermediate data requiring processing by a local reducer within a successive cycle with respect to a reducer node into the reducer node intermediate local reduce data class, and classifying intermediate data identified as forming part of a final output with respect to a reducer node into the partial output class;
wherein at least one of the classes of data comprises intermediate data which are processed in a map-reduce cycle subsequent to the current map-reduce cycle and wherein each portion of intermediate data is classified into a single one of the plurality of classes and wherein the intermediate data is read directly by a subsequent task from a preceding task selected from: one of the plurality of map nodes or one of the plurality of reducer nodes.

17. The computer program product according to claim 16, wherein:
the intermediate data comprise intermediate data produced by the map nodes in the current map-reduce cycle; and
the plurality of classes comprise at least two classes of the intermediate data produced by the map nodes in the current map-reduce cycle.

18. The computer program product according to claim 17, wherein the at least two classes include:
a first class of data, which are communicated to one or more of the reducer nodes within the current map-reduce cycle; and
a second class of data, which are processed by one or more map tasks in the map-reduce cycle subsequent to the current map-reduce cycle;
wherein the first and second classes of data are non-overlapping with respect to one another.

19. The computer program product according to claim 16, wherein:
the intermediate data comprise intermediate data produced by the reducer nodes in the current map-reduce cycle; and
the plurality of classes comprise at least two classes of the intermediate data produced by the reducer nodes in the current map-reduce cycle.

20. A method comprising:
identifying intermediate data comprising:
intermediate data produced by a plurality of map nodes in a distributed network, in a current map-reduce cycle; and
intermediate data produced by a plurality of reducer nodes in the distributed network, in the current map-reduce cycle;
identifying a plurality of classes of data, for classifying the identified intermediate data; and
classifying discrete portions of the identified intermediate data into respective ones of the classes of data;
the plurality of classes comprising:
at least two classes of the intermediate data produced by the map nodes in the current map-reduce cycle; and
at least three classes of the intermediate data produced by the reducer nodes in the current map-reduce cycle;
the at least two classes of the intermediate data produced by the map nodes in the current map-reduce cycle including:
a first class of data, wherein intermediate data requiring processing by a reduce task within the same cycle is classified within the first class of data; and
a second class of data, wherein intermediate data requiring processing by a map task within a subsequent map-reduce cycle is classified within the second class of data;
wherein the first and second classes of data are non-overlapping with respect to one another; and
the at least three classes of the intermediate data produced by the reducer nodes in the current map-reduce cycle including:
a third class of data, wherein intermediate data requiring processing by all reducers within a subsequent map-reduce cycle is classified within the third class of data;
a fourth class of data, wherein intermediate data requiring processing by a local reducer within a subsequent map-reduce cycle is classified within the fourth class of data; and
a fifth class of data, wherein intermediate data identified as forming part of a final output is classified within the fifth class of data;
wherein the third, fourth, and fifth classes of data are non-overlapping with respect to one another.

* * * * *